3,541,113
PREPARATION OF ε-CAPROLACTONE
Johan P. H. von den Hoff, Geleen, Netherlands, assignor to Stamicarbon N.V., Heerlen, Netherlands
No Drawing. Filed Feb. 20, 1968, Ser. No. 706,765
Claims priority, application Netherlands, Feb. 25, 1967, 6703009
Int. Cl. C07d 7/06
U.S. Cl. 260—343     5 Claims

ABSTRACT OF THE DISCLOSURE

A process is distributed wherein cyclohexanone is oxidized to ε-caprolactone in the liquid phase with molecular oxygen using a soluble nickel salt as catalyst and in the presence of benzaldehyde.

---

The present invention relates to the preparation of ε-caprolactone from cyclohexanone.

It is a common knowledge that cyclohexanone, in the liquid phase, can be oxidized to ε-caprolactone by means of molecular oxygen, if the oxidation is carried out in the presence of an aromatic or saturated aliphatic aldehyde. See, for instance, U.S. Pat. 3,025,306. The aldehyde is also oxidized in the process, so that the corresponding carboxylic acid is obtained. This oxidation also requires the presence of a catalyst.

The catalysts employed are generally compounds of the metals of the platinum group and of the palladium group, and compounds of cobalt, manganese, vanadium, zirconium, aluminium, antimony, beryllium, and copper.

However, even after long reaction times, only comparatively low yields of ε-caprolactone are usually obtained by this process.

According to the present invention a process is provided whereby higher yields are attained, even after shorter reaction times.

It has now been found that ε-caprolactone can be prepared by catalytic oxidation of cyclohexanone in the liquid phase by means of a gas containing molecular oxygen and in the presence of an aldehyde, if the oxidation is carried out using benzaldehyde as the aldehyde and using a nickel salt dissolved in the reaction mixture as catalyst.

According to the invention, the nickel salts used for the catalyst are dissolved in the reaction mixture. As the oxidation is carried out in the presence of benzaldehyde by-product benzoic acid is formed in the reaction mixture. The nickel compound used may be, e.g. nickel carbonyl or an oxide, which forms nickel benzoate, or use may also be made of other nickel salts, for instance, nickel oleate, nickel naphthenate, and nickel octoate.

In carrying out the oxidation a gas containing molecular oxygen, e.g. air, can be passed through the liquid reaction mixture in any conventional simple way. The oxidation proceeds smoothly if the temperature is kept below about 100° C., preferably between about 20 and 50° C. The pressure is not critical, may be varied and maintained, for instance, at 5, 10, 25 or 50 atm. It is, however, simpler to carry out the reaction at atmospheric pressure.

The oxidation may also be carried out in the presence of a solvent which is preferably inert to the oxidizing conditions of the reaction, e.g. a hydrocarbon, a chlorinated hydrocarbon, such as chlorobenzene, or an ester, such as ethyl acetate.

By this means higher yields of the desired product ε-caprolactone can be obtained in relatively short reaction times both in the form of monomeric and in the form of polymeric caprolactone. Usually some hydrolysis to ε-hydroxycaproic acid takes place, and a small amount of adipic acid is found in the reaction product as a byproduct. This process is illustrated in the following examples.

EXAMPLE I

In a reaction vessel provided with a stirrer, a feeding device, a thermometer, a reflux cooler, and a gas inlet tube, 304 g. of benzaldehyde (2.87 moles) is added, in 45 minutes, to 562 g. of cyclohexanone (5.74 moles) and 0.2 g. of nickel octoate at 35–40° C. with simultaneous stirring, while 400 litres of air are passed through per hour.

The oxygen content of the gas discharged from the reactor through the reflux cooler is measured continuously.

During the addition of benzaldehyde the oxygen content of the vent gas rapidly falls to 15% after about 6 minutes, remains virtually constant until all benzaldehyde has been fed in, and then rises slowly to 19.6% (after 75 minutes), after which the experiment is stopped. The amount of oxygen absorbed during the reaction time of 2 hours is 30 litres (1.34 moles).

The reaction product contains 91.2 g. of benzaldehyde (0.86 mole), 425 g. of cyclohexanone (4.34 moles), 212 g. (1.74 moles) of benzoic acid, 115 g. (0.99 mole) of ε-caprolactone, polycaprolactone, and ε-hydroxycaproic acid, which three products together have been calculated as caprolactone, and 10.2 g. (0.07 mole) of adipic acid.

These amounts correspond to an efficiency of 86% benzoic acid, 71% ε-caprolactone, and 1.2% adipic acid, calculated to the starting material converted.

EXAMPLE II

The reaction vessel described in Example I is provided with an overflow tube, through which the reaction mixture is discharged continuously.

After a reaction mixture as described in Example I has been prepared, a starting mixture in which the molar cyclohexanone/benzaldehyde ratio is 2:1 and which contains 1 g. of nickel oleate per kg. is fed in for 6 hours. The feed rate is so chosen that the retention time of the reaction mixture is 2 hours, while 408 g. of starting mixture (2.7 moles of cyclohexanone and 1.35 moles of benzaldehyde) is fed in per hour.

The reaction mixture discharged in the sixth hour contains: benzaldehyde 51.5 g. (0.49 mole), cyclohexanone 197 g. (2.01 moles), ε-caprolactone 64.5 g. (0.58 mole), benzoic acid 104.0 g. (0.86 mole), and adipic acid 2.20 g. (0.02 mole), which means an efficiency of 98% benzoic acid, 85% caprolactone, and 3% adipic acid, referred to the starting material converted.

This invention is, of course, not limited to the specific methods of these examples, but only by the spirit and scope of the following claims.

What is claimed is:

1. In processes for preparing ε-caprolactone by catalytic oxidation of cyclohexanone in the liquid phase by means of a gas containing molecular oxygen and in the presence of an aldehyde, the improvement consisting essentially in using benzaldehyde as the aldehyde and using a nickel compound soluble in the reaction mixture as the catalyst and selected from the class consisting of nickel carbonyl, nickel oxide and nickel salts of organic carboxylic acids.

2. The process of claim 1 conducted at a temperature between about 20–100° C. and a pressure between about 1 and 50 atmospheres.

3. The process of claim 1 wherein a solvent is employed.

4. The process of claim 1 wherein said nickel compound is a member selected from the group consisting of nickel carbonyl, nickel oxide, nickel benzoate, nickel oleate, nickel naphthenate, and nickel octoate.

5. The process of claim 1 carried out by continuous introduction of the starting material mixture, containing catalyst, and by continuous withdrawal of the product mixture from the reaction vessel.

References Cited

UNITED STATES PATENTS 3,025,306   3/1962   Guest et al. -------- 260—343

OTHER REFERENCES

Berkman: "Catalysis," Reinhold Pub., Inc., New York (1940), pp. 657 and 792.

HENRY R. JILES, Primary Examiner

J. M. FORD, Assistant Examiner